Patented Apr. 15, 1941

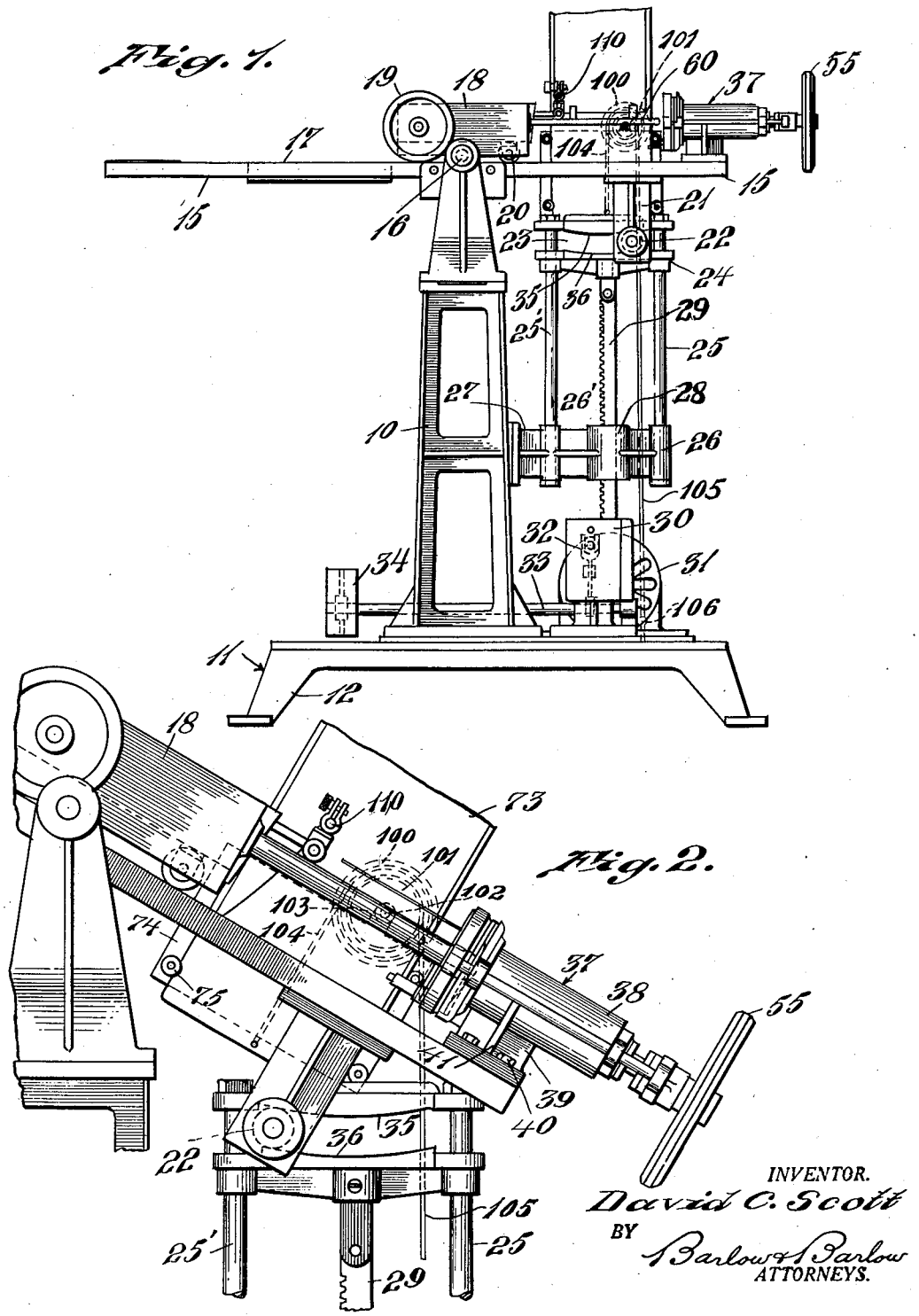

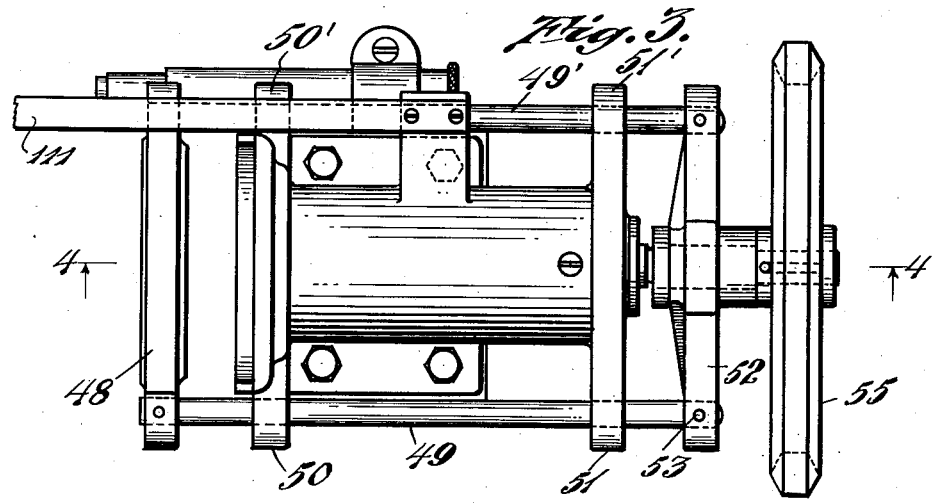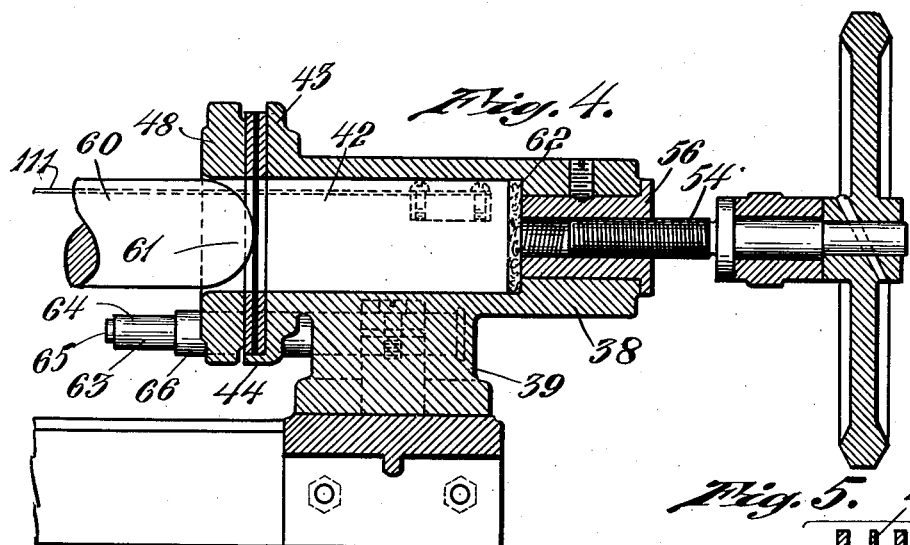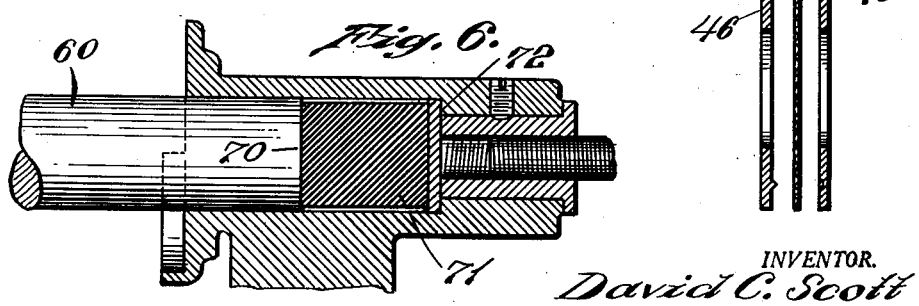

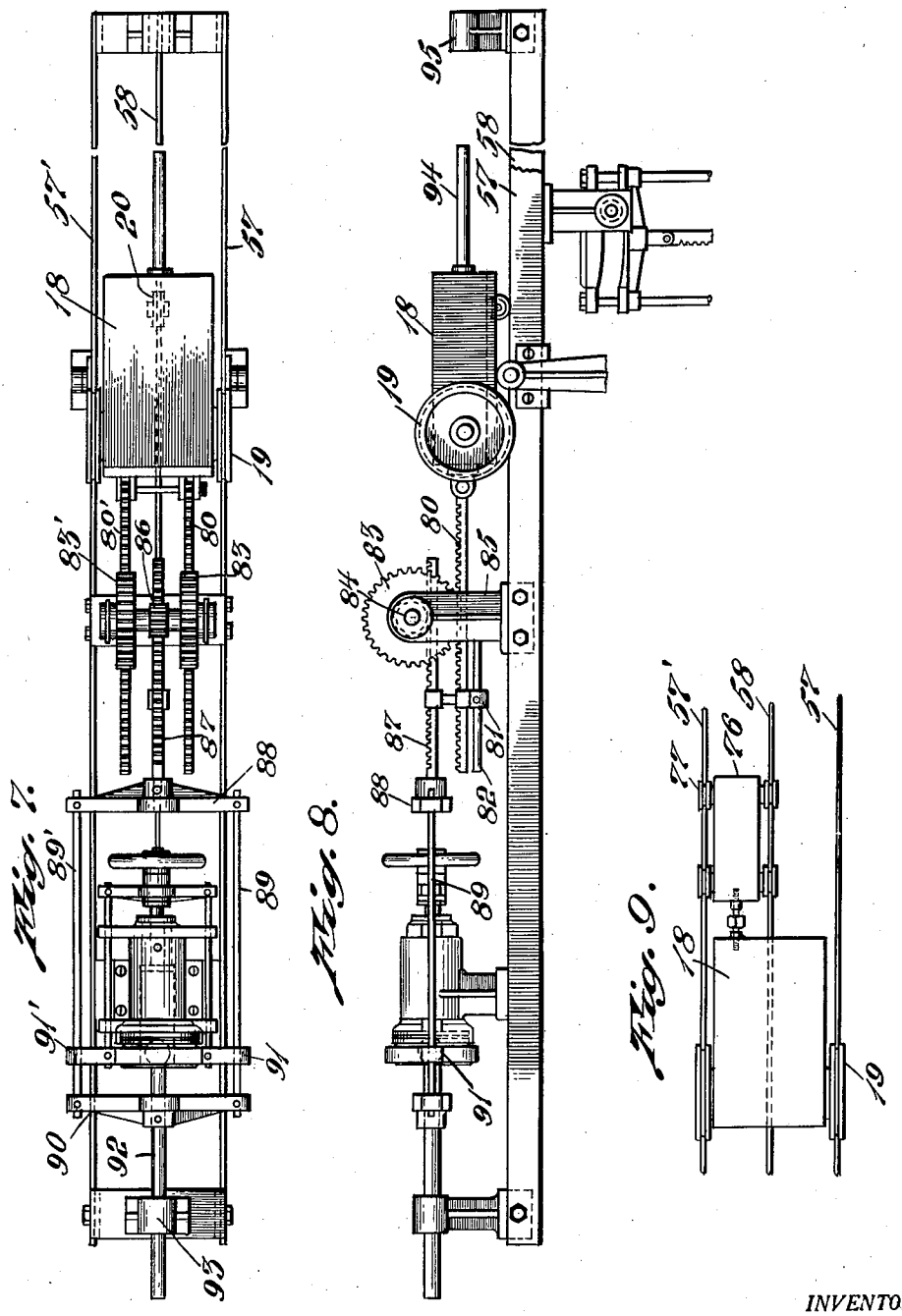

2,238,539

UNITED STATES PATENT OFFICE 2,238,539

PRESSURE TESTING MACHINE

David C. Scott, Providence, R. I., assignor to Henry L. Scott Company, a corporation of Rhode Island Application June 8, 1938, Serial No. 212,479

4 Claims. (Cl. 265—16)

This invention relates to a testing machine more particularly for testing the compression or bursting strength of materials; and has for one of its objects to provide in such a machine an arrangement whereby a specimen may be tested by application of a constant pressure upon the specimen regardless of any deflection of the surface of the specimen to which the pressure is applied.

Another object of the invention is to use an inclinable plane with a weight mounted to move along the plane and to exert a pressure upon the specimen tested in conformity with the amount of inclination of the plane.

Another object of the invention is to apply the pressure at a constant rate of speed by imparting to the inclined support a varying rate of inclination whereby uniformly increasing pressure on the specimen may be obtained.

Another object of the invention is to provide an inclined plane which may be actuated by application of movement to incline the plane at a point offset from a parallel plane passing through the pivotal axis of the inclinable plane.

Another object of the invention is to provide a means whereby the weight or force applied may be multiplied prior to its exerting pressure upon the specimen.

With these and other objects in view, the invention consists of certain novel features of construction, as will be more fully described, and particularly pointed out in the appended claims.

In the accompanying drawings:

Fig. 1 is a side elevation of my improved testing machine;

Fig. 2 is a fragmental portion of the machine showing the plane on which the weight moves as inclined;

Fig. 3 is a top plan view of the specimen holder and plunger receiving portion of the machine;

Fig. 4 is a sectional view thereof on substantially line 4—4 of Fig. 3;

Fig. 5 is a sectional view of the plates as shown in Fig. 4 but in a somewhat exploded arrangement;

Fig. 6 is a fragmental sectional view of a part of the chamber shown in Fig. 4 and illustrating a different mounting of a test specimen therein;

Fig. 7 is a top plan view of a modified form of specimen mounting and weight arrangement;

Fig. 8 is a side elevation of the parts shown in Fig. 7;

Fig. 9 is a fragmental view showing a modified form of applying weights or carriages on the machine.

The most widely used type of machines now on the market for testing materials by compression or applying pressure upon the materials are machines which are screw operated to mechanically apply a pressure upon the specimen tested. In this type of machine the resistance varies and the elasticity of the materials play an important part in causing a varying load per unit of time to be applied. To overcome such objection and to obtain the application of a pressure upon the specimen at a constant rate regardless of any deflection of the specimen due to elasticity or otherwise, I have arranged a machine constructed to operate upon the principle of a weight rolling upon an inclined plane in which the weight causes the pressure to be applied to the specimen to be tested in accordance with the angle of the support upon which the weight rests so that as the support is tipped the weight is caused to exert a force upon the specimen proportional to a certain function of the degree of inclination of the plane or support; and I have arranged that a constant speed of the actuating member will be caused to move the support so as to produce a uniformly increasing force upon the specimen to be tested, the weight being so arranged as to automatically take up or compensate for the stretch or deflection of the specimen as the load is applied; and the following is a more detailed description of the present embodiment of this invention, illustrating the preferred means by which these advantageous results may be accomplished:

With reference to the drawings, 10 designates the framework standard of the machine which is supported upon a base 11 having legs 12 to rest upon some floor or the like. At the upper end of the standard 10 a beam 15 is pivotally mounted as at 16 with its upper supporting surface 17 passing substantially through the center of the pivotal mounting. This beam is inclinable about the pivot 16 as a center and presents a supporting surface at either side of the pivotal mounting in a single plane in the form of a spaced pair of tracks 57, 57' with a middle track 58 between them upon which a weight 18 is rollingly supported by means of wheels 19, 19' engaging the tracks 57, 57' and 20 engaging the track 58.

This beam 15 is inclinable in a controlled manner by reason of the downwardly extending pair of legs 21 which support a roll 22 between them, this roll engages the walls of a slot 23 of the yoke or cross-head 24 which is formed on the ends of a pair of vertically movable guide rods 25, 25' slidable in the cylindrical guides 26 and 26' of the bracket 27 secured to the standard 10. This bracket 27 has an enlarged portion 28 with an opening through it for free passage of the rack bar 29 which is connected to the cross-head at its upper end and is moved downwardly by the gears in the gear box 30 driven by an electric motor 31 and controlled through the clutch 32 and clutch rock shaft 33 by the pedal 34.

Inasmuch as the yoke or cross-head 24 is situated to engage a part attached to the beam at a point offset from the weight supporting plane passing through the pivot for the beam 15, I have curved the opposite engaging edges of the slot 23 as at 35 and 36 for engagement with the roll 22 so as to more accurately control the movement of the beam 15 as inclination of the beam takes place.

The specimen is mounted upon the beam 15 by means of a unit 37 (see Figs. 2, 3 and 4) which consists of a cylindrical body 38 having a pedestal portion 39 rigidly secured to the beam as by bolts 40. Suitable reinforcing ribs 41 are utilized for strengthening the mounting of this unit in position. The body 38 has a cylindrical bore 42 while a flange 43 at the forward end of the body with a lip 44 at its lower edge provides for the reception and support of a pair of binding plates 45 and 46 for holding a specimen 47 to be tested between them. A clamping member 48 is slidably mounted by means of rods 49, 49' in the guide arms 50, 50' and 51, 51' extending from the body, which rods are joined together by the cross-head 52 which is pinned as at 53 to the slide rods 49. A shaft 54 has threaded engagement with the bushing 56 in one end of the body 38 with a collar abutting against the yoke 52 while a wheel 55 is secured to the shaft 54 so that by turning this wheel plate 48 may be drawn against the specimen holder and the specimen may be mounted firmly in position as illustrated in Fig. 4.

The weight 18 which consists of a carriage of a known mass will roll on the tracks 57, 57' of the beam as the beam 15 is inclined so that the weight or carriage 18 will travel along the beam. This carriage carries a ram rod or plunger 60 having a rounded end as at 61 which will engage the specimen. In use, the plunger will be in engagement with the specimen when the beam is in substantially horizontal position and then as the beam is inclined greater pressure will be applied upon the specimen but with a constantly increasing load so long as the rack 29 is lowered at a constant rate. The constant rate of lowering the cross-head will cause the angle to change at a varying rate, but as the sine of the angle which represents the load applied expresses the load applied, and as the sine of the angle is expressed by the direction of movement of the rack 29, accordingly, a constant rate of load will be applied to the specimen, and this will be true regardless of whether the specimen is deflected or how much it is deflected while being held in the position shown in Fig. 4.

The pressure will be continued until the specimen breaks when the plunger being unresisted will roll into engagement with the cushioning stop 62 in the end of the bore 42 of the specimen mounting unit, or it may be so arranged that the carriage may engage a dash pot device 63 comprising a rubber end 65 on the end of a movable piston 64 slidable in the cylindrical member 66 which may contain some shock absorbing medium in the form of either sponge rubber or some hydraulic or liquid controlling means, the details of which are not part of this invention.

In other instances instead of there being the plates 45 and 46 the plunger 60 may have a square end 70, as shown in Fig. 6, which may engage a specimen 71 in the bore 42 and there apply pressure against the specimen which is backed up by a plate 72 at the end of the bore. The specimen 71 may be rubber or other material to be tested which may as the pressure is applied be changed in shape while the rate of application of load will be constant.

The behavior of the specimen will be recorded on a chart secured upon a platen 73 which is arranged to be moved as hereinafter described so that the chart is moved to respond in a direction to indicate the amount of load applied, while the pen 110 which is fixed to the carriage 18 will move over the chart in a right angular direction with respect thereto and will indicate the elongation of the specimen for the provision of a graph of the behavior of the specimen under test.

A member 111 secured to cylinder 38 projects into the path of the recorder pen mounting so as to swing the recorder pen from the chart at the end of the travel of the carriage which carries the pen.

A platen holder frame 74 is fixed to the beam 15 for slidably mounting the platen 73. To this platen holder frame 74 are rotatably secured anti-friction rolls 75 which are positioned in spaced relation thereon and arranged to engage the longitudinal edges of the platen 73 and provide guides for the movement of the platen in the desired direction at right angles to the surface 17 of the inclinable beam 15. This platen 73 is moved downwardly by gravity and in order to control the movement thereof grooved wheels 100 and 101 are secured in spaced relation on a short shaft 102 rotatably mounted in a bearing 103 extending from the upper edge of the platen frame 74. A flexible connector 104 such as a cord is partially wrapped about the groove in the wheel 100 with one of the ends fixed to the wheel 100 and then extending therefrom with its other end fixed to the lower portion of the platen 73. A flexible connector 105, which also may be a cord-like element, is fixed at one of its ends to the wheel 101 and is partially wrapped about the wheel and then extends to be anchored at its other end to the base of the machine in an eye bolt 106 or the like.

It will now be apparent that as the beam 15 and the platen frame 74 are moved downwardly, the connector 105 will be slackened and permit the platen 73 to move downwardly by gravity until the slack in the connector is taken up by the wheel 101 which is rotated through its connection with the wheel 100 which in turn is rotated by the movement of the platen through the connector 104. The movement of the beam 15 in an upward direction will cause a reversal of the rotation of these wheels and move the platen upwardly to its initial setting. The wheels 100 and 101 are proportioned to provide for the proper relative movement of the platen with respect to the movement of the beam 15.

The weight of carriage 18 may be varied or a lighter carriage than used for spanning the tracks 57, 57' may be provided, as the narrower and lighter carriage 76 which will have rolls or wheels 77 to engage the track 58 and one track at either side thereof as 57 or 57', and theoretically it may be desirable that such a carriage 76 be used in addition to and with the carriage or weight 18, but more likely either may be used alone depending upon the range of pressure which is to be applied to the specimen. Where the two carriages are to be used together the small carriage may be on either side of the large one and connected thereto either for the transmission of a pull or a push so that they will act together.

It may sometimes be desirable that a multiplication of the weight be applied to the specimen, and in order to accomplish this, I have illustrated a modified arrangement in Figs. 7 and 8. In these figures the carriage or weight 18 has a pair of rack bars 80, 80' extending therefrom which are suitably guided by the slide member 81 on rod 82. These racks engage gears 83, 83' which are fixed to shaft 84 rotatably mounted in the stand 85 carried on the beam so that this gear will turn the shaft 84. Between the gears 83 and 83' there is a gear 86 which is also fixed to this shaft 84 and rotates therewith when the gears 83 and 83' are rotated. This gear 86 meshes with a rack 87 which is fixed to the cross-head 88 on the ends of guide rods 89 and 89' and which has another cross-head 90 at the opposite end of these rods. These rods 89, 89' slide through the fixed guides 91, 91' and by means of the ram 92 which is carried by the cross-head 90 and guided in the slideway 93 apply a pressure upon the work which is held as previously more fully described in connection with Figs. 3 to 6, inclusive. In this instance a rod 94 may be carried by the weight or carriage 18 and some abutment stop 95 having some cushioning element in it is carried by the beam for the limiting of movement of the weight after the specimen breaks.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a testing machine, a pivoted support, means to mount a specimen to be tested, a weight mounted to roll on a surface of said support and adapted to exert pressure upon a specimen to be tested, an endways movable driving member provided with a transversely disposed slot having oppositely arcuately disposed side walls, a connecting member carried by said support out of the plane of said surface of said support and slidably engaging said side walls, the arc of said slot being predetermined to uniformly move said connecting member upon uniform endways movement of said driving member.

2. In a testing machine, a tiltable support, a weight movably mounted on said support, specimen carrying means on and tiltable with said support, means on said support for transmitting force to a specimen to be tested, means for inclining the support to cause the weight to move, and means carried by and tiltable with said support to transmit and multiply the effective gravitational pressure of said weight to the second named means.

3. In a testing machine, a tiltable support, a weight movably mounted on said support, specimen carrying means on and tiltable with said support, means on said support for transmitting force to a specimen to be tested, means for inclining the support to cause the weight to exert a pressure on the specimen, and gear means carried by the support and tiltable therewith through which said pressure is multiplied and applied from the weight to said second named means.

4. In a testing machine, a tiltable support, a weight movably mounted on said support, specimen carrying means on and tiltable with said support for resisting force on a specimen to be tested, means for inclining the support to cause the weight to move, a rack carried by said support connected to said weight, a rack carried by said support connected to said specimen and gear means carried by said support engaging both of said racks through which the effect of the weight is transmitted to the specimen.

DAVID C. SCOTT.